US006314449B1

(12) United States Patent
Gallagher et al.

(10) Patent No.: US 6,314,449 B1
(45) Date of Patent: Nov. 6, 2001

(54) METHOD AND SYSTEM FOR ACCESSING APPLICATION LOG MESSAGES APPEARING IN A WEB-BASED USER INTERFACE IN A DISTRIBUTED NETWORK

(75) Inventors: Edward Joseph Gallagher; Duane Neale Barret, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,493

(22) Filed: Aug. 28, 1998

(51) Int. Cl.$^7$ .............................. G06F 3/00; G06F 19/00; G06F 15/16
(52) U.S. Cl. ........................ 709/202; 345/338; 345/339; 345/336; 707/516; 709/203
(58) Field of Search ..................................... 709/218, 203, 709/202; 345/336, 338, 339; 707/516

(56) References Cited

U.S. PATENT DOCUMENTS

| | | |
|---|---|---|
| 4,789,962 | 12/1988 | Berry et al. . |
| 5,121,475 | 6/1992 | Child et al. . |
| 5,123,086 | 6/1992 | Tanaka et al. . |
| 5,159,669 | 10/1992 | Trigg et al. . |
| 5,179,654 | 1/1993 | Richards et al. . |
| 5,297,249 | 3/1994 | Bernstein et al. . |
| 5,388,251 | 2/1995 | Makino et al. . |
| 5,434,963 * | 7/1995 | Kuwamoto et al. ................ 345/338 |
| 5,546,521 | 8/1996 | Martinez . |
| 5,563,805 * | 10/1996 | Arbuckle et al. ..................... 709/204 |
| 5,572,643 * | 11/1996 | Judson ................................. 709/218 |
| 5,581,684 | 12/1996 | Dudzik et al. . |
| 5,638,509 | 6/1997 | Dunphy et al. . |
| 5,737,619 * | 4/1998 | Judson ................................. 707/500 |
| 5,745,754 * | 4/1998 | Lagarde et al. ...................... 707/104 |
| 5,877,757 * | 3/1999 | Baldwin et al. ..................... 345/336 |
| 5,933,140 * | 8/1999 | Strahorn et al. ..................... 345/338 |
| 6,021,418 * | 2/2000 | Brandt et al. ........................ 707/516 |
| 6,021,435 * | 2/2000 | Nielson ................................ 709/224 |
| 6,035,330 * | 3/2000 | Astiz et al. .......................... 709/218 |
| 6,166,735 * | 12/2000 | Dom et al. ........................... 345/339 |

OTHER PUBLICATIONS

"GTOOLS: An active GUI toolset for an object–oriented KBMS," H. Lam et al. *Computer Systems Science & Engineering*, Vol. 7, No. 2, Apr. 1992,69–85.
"Automatic Generation of On–Line Documentation in the IDAS Project," Ehud Reiter et al.

* cited by examiner

*Primary Examiner*—Krisna Lim
(74) *Attorney, Agent, or Firm*—Sawyer Law Group LLP; Noreen A. Krall

(57) ABSTRACT

A method and system for accessing log messages in a distributed network is disclosed. In a first aspect, the method and system comprise selecting a plurality of application log messages from a manager within the network and displaying the plurality of log messages via a browser user interface in the first window. In a second aspect, the method and system further includes selecting a particular log message from the plurality of log messages and displaying help-text related to the selected particular log message via the browser user interface. In summary, a method and system for providing easy access to Help text regarding application log messages in a browser user interface displays application log messages on a Java applet panel within the browser. When the user double-clicks on a message, a new Web browser window is displayed which includes an HTML page with the message text, a detailed explanation of the message, and the recommend user response. While browsing the log messages the user might need further information about the message. Finding help for the message is accomplished by clicking on the message within the user interface. This causes another Web browser window to be displayed which contains additional information concerning the message.

21 Claims, 5 Drawing Sheets

US 6,314,449 B1

METHOD AND SYSTEM FOR ACCESSING APPLICATION LOG MESSAGES APPEARING IN A WEB-BASED USER INTERFACE IN A DISTRIBUTED NETWORK

FIELD OF THE INVENTION

The present invention relates generally to a distributed network and more particularly to a method and system for accessing log messages in such a system.

BACKGROUND OF THE INVENTION

A distributed Transmission Control Protocol/Internet Protocol (TCP/IP) network typically includes a server or manager which monitors a plurality of agents. The monitor includes software within it that reports disk space on the plurality of servers. The network in this type of environment typically comprises an OS/390 AIX or WIN NT type system. The software in turn has access to a database and a data log which would be utilized to record this information. Typically an application running on the server in a distributed TCP/IP network writes messages to a log. Typically to obtain these log messages a hard copy must be obtained. A second way to obtain these log messages would be to actually access the data on the remote application or remote site.

It has been desirable to provide a network environment in which TCP/IP commands would be utilized to access log messages. It would also be desirable to be able to browse the log for the various messages. In addition, while browsing the log message a user may require further explanations about a particular log message. Help text regarding log messages/codes can be difficult to find, requiring a lookup in hard copy reference documents or searching through online help documentation.

Accordingly, what is needed is a system and method for allowing quick access to log messages as well as a system for helping find a specific message. In addition, it is important for the user to be able to view a detailed explanation of a logged message to further understand the particular message provided. The present invention addresses such a need.

SUMMARY OF THE INVENTION

A method and system for accessing log messages in a distributed network is disclosed. In a first aspect, the method and system comprise selecting a plurality of application log messages from an agent within the network and displaying the plurality of log messages via a browser user interface in the first window. In a second aspect, the method and system further includes selecting a particular log message from the plurality of log messages and displaying help-text related to the selected particular log message via the browser user interface.

In summary, a method and system for providing easy access to Help text regarding application log messages in a browser user interface displays application log messages on a Java applet panel within the browser. When the user double-clicks on a message, a new Web browser window is displayed which includes an HTML page with the message text, a detailed explanation of the message, and the recommend user response. While browsing the log messages the user might need further information about the message. Finding help for the message is accomplished by clicking on the message within the user interface. This causes another Web browser window to be displayed which contains additional information concerning the message.

DETAILED DESCRIPTION OF THE INVENTION

The present invention relates to a distributed network and more particularly to a method and system for accessing log messages in such a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
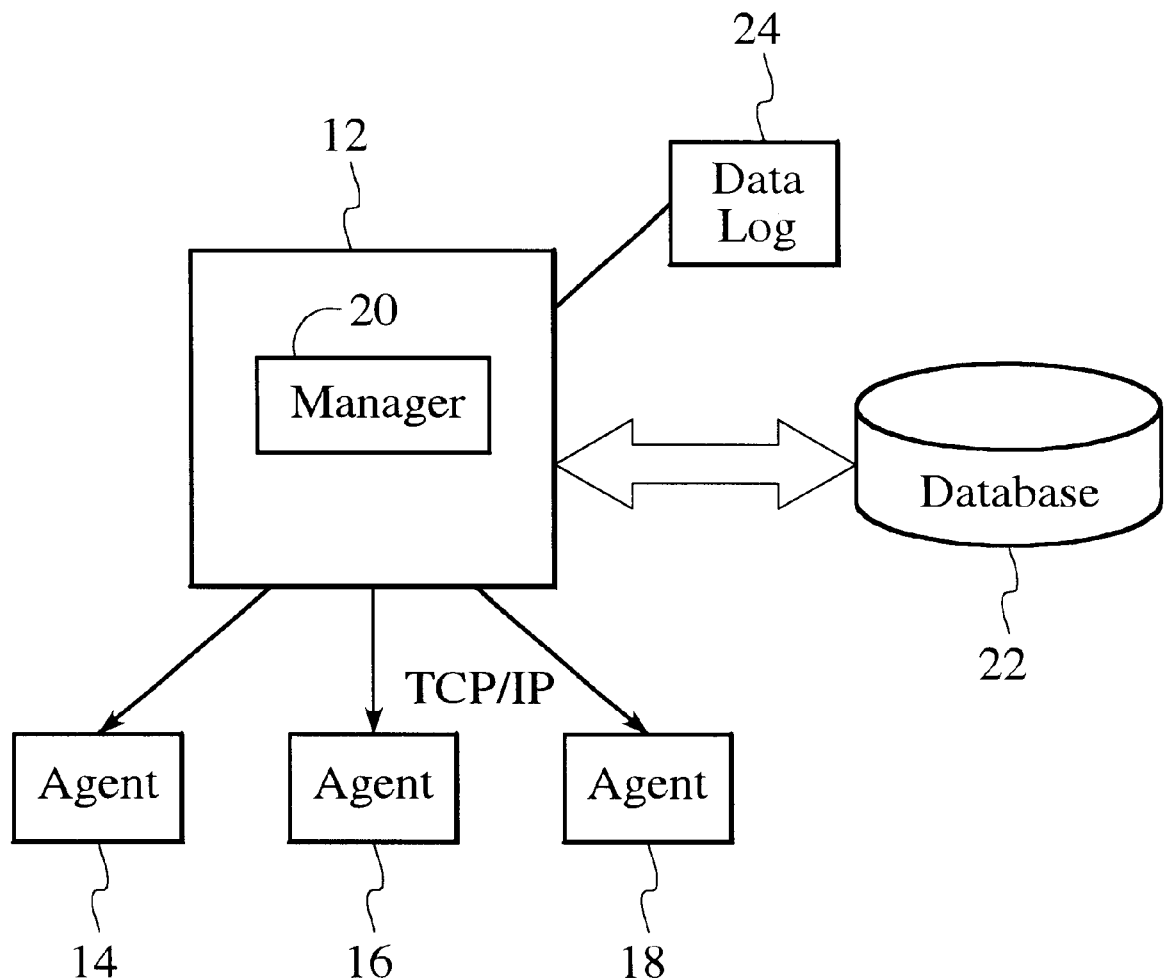
FIG. 1 is a block diagram of a conventional distributed network.

FIG. 1 is a block diagram of a conventional distributed network system 10. In such a system 10 there is a main server 12 which is in communication with a plurality of remote agents 14, 16 and 18. Within the server is a manager 20 typically which reports the disk space available on the various applications. The manager 20 provides information on a data base 22 and also has a data log 24 which is utilized to record log messages regarding the various remote agents 14, 16 and 20 on the distributed network. In a typical system, it is typically not possible to obtain log messages readily from the remote applications. The primary way of actually obtaining those log messages is to look up in a hard copy reference document or searching through online help documentation. The other method is to actually go to the remote application and review the material on that application.

Figure 2:
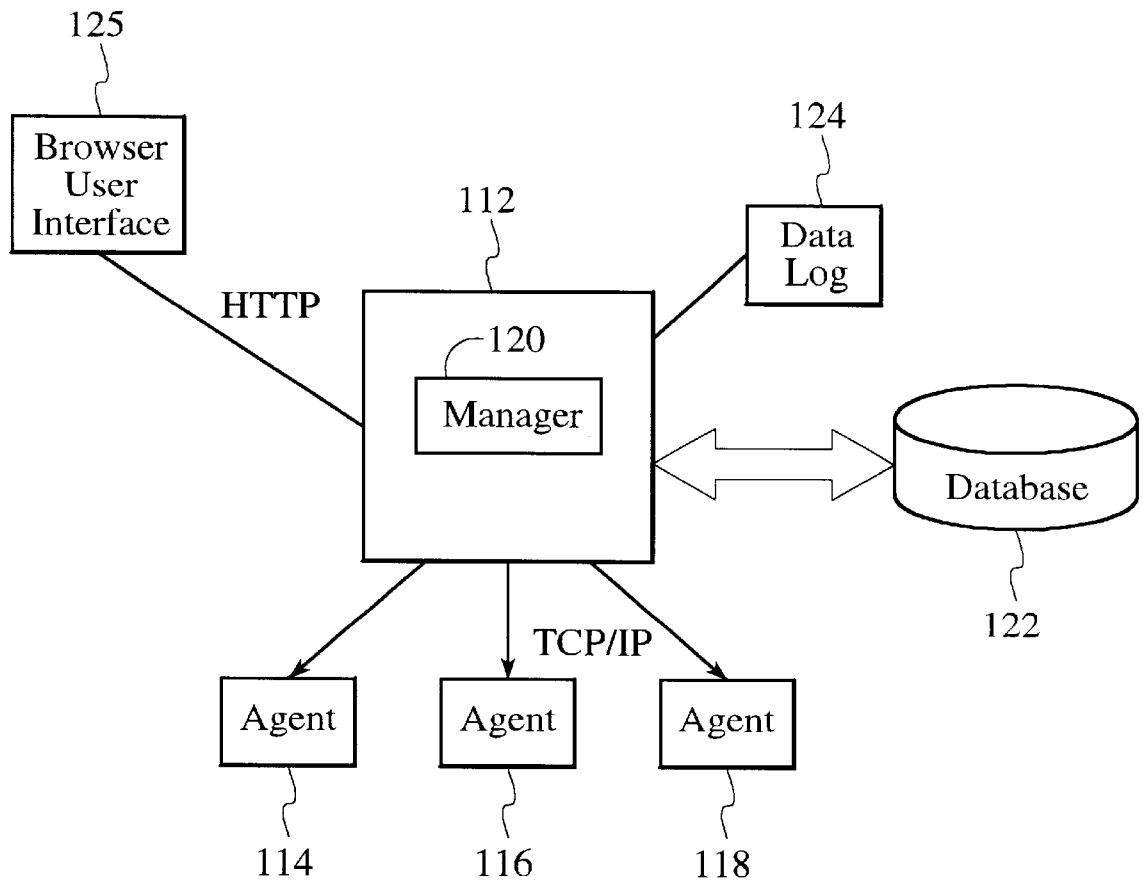
FIG. 2 is a block diagram of distributed network in accordance with the present invention.

The present invention utilizes a browser capability to obtain this log information, particularly using a web based user interface which includes this log browsing capability. Furthermore, the present invention includes the ability to obtain a more detailed explanation of the log message which is currently displayed on the browser simply by double-clicking on the message within the user interface. To more specifically describe the features of the present invention, refer now to FIG. 2, which is a block diagram of a distributed TCP/IP system 100 in accordance with the present invention.

Accordingly, the system 100 is very similar to that of FIG. 1, except that the manager 120 includes a browser user interface 125. The browser user interface can be, for example, Netscape Navigator, Microsoft Internet Explorer, or the like. The browser user interface 125 also has the ability to provide performance data information to a database.

Figure 3:
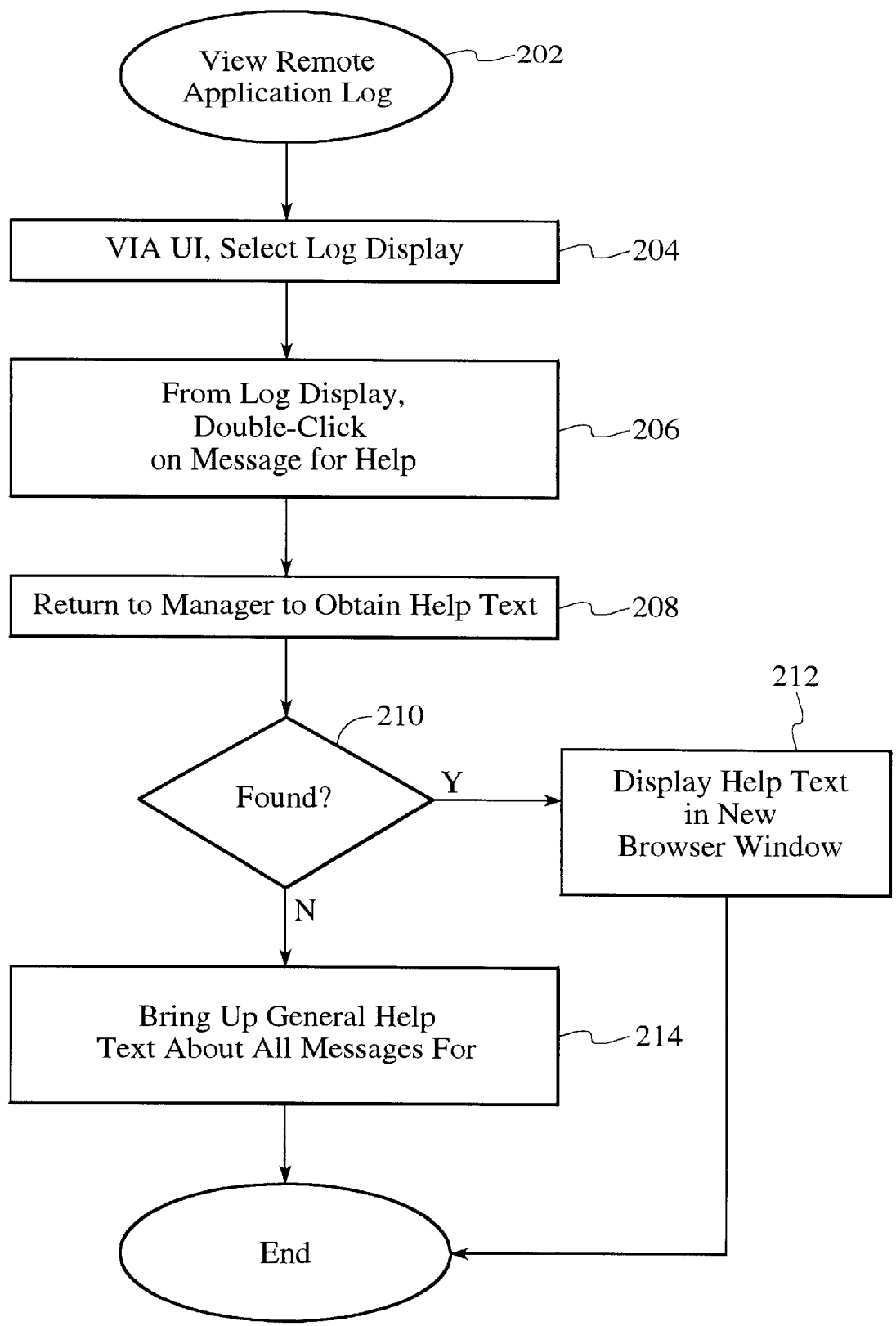
FIG. 3 is a flow chart of the operation of the system in accordance with the present invention.

FIG. 3 is a flow chart of the operation of the system in accordance with the present invention. First remote application log messages are viewed, via step 202. Next a log display is selected via a user interface. Next, one of the messages is double clicked on the selected message for help, via step 206. Then obtain help text is obtained from the manager, via step 208. If the text is found, then the help text is provided in a new browser window, via step 212. If the text is not found, then general help text is provided for all of the messages, via step 214.

Figure 4:
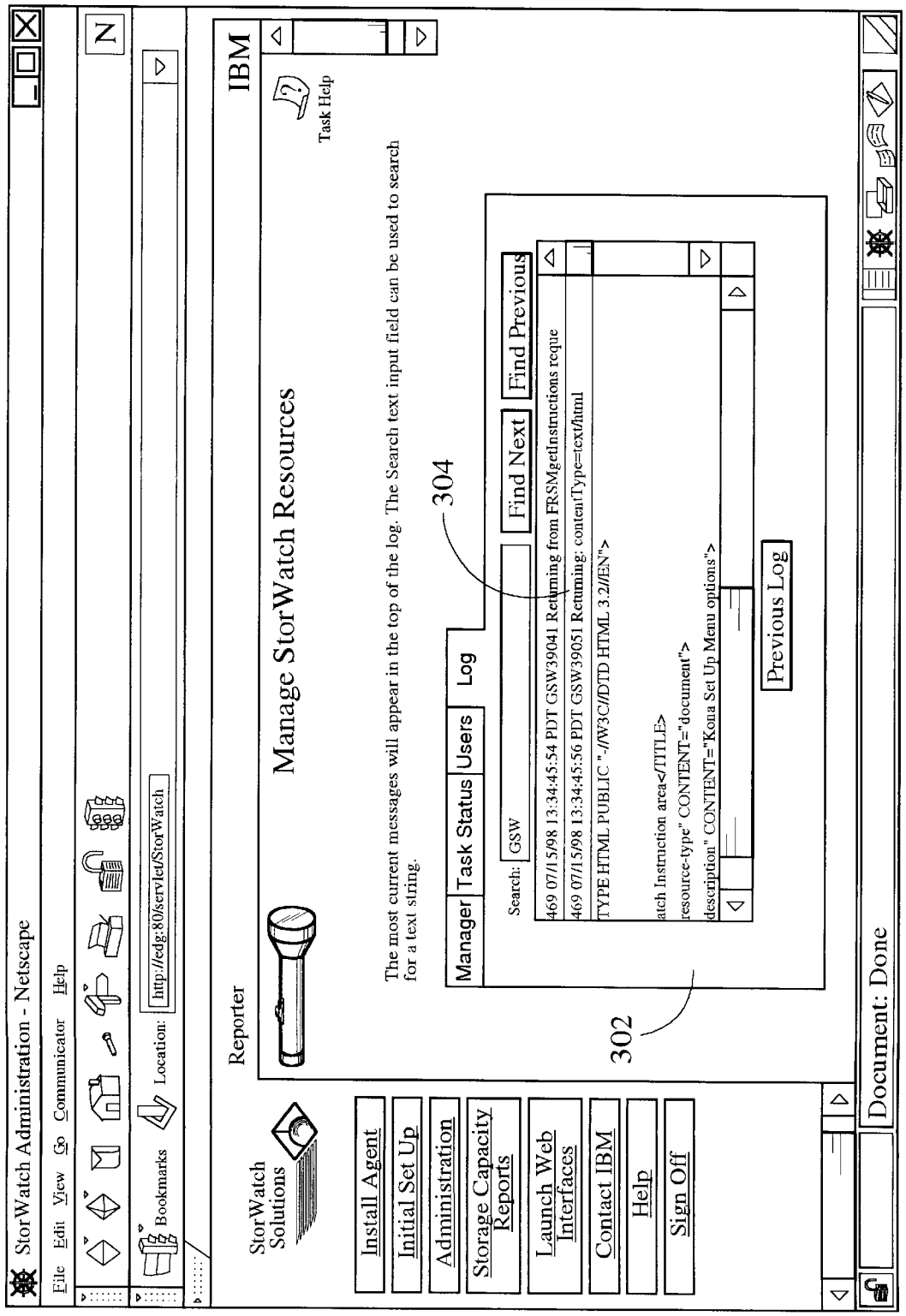
FIG. 4 is a diagram showing a plurality of log messages.

The present invention in a preferred embodiment uses a Java applet as part of the user interface to construct and display a panel with a list of log messages produced by the application. FIG. 4 shows a display panel 300 with a list of log messages 302 from the application. Double-clicking on a message 304 (such as message no. GSW39051) within the list box results in an http request being made to the manager. This request includes:

(1) a code indicating that a message help page is to be built in a new Web browser window; and (2) an identifying number (i.e., message no. GSW39051) for the message.

Figure 5:
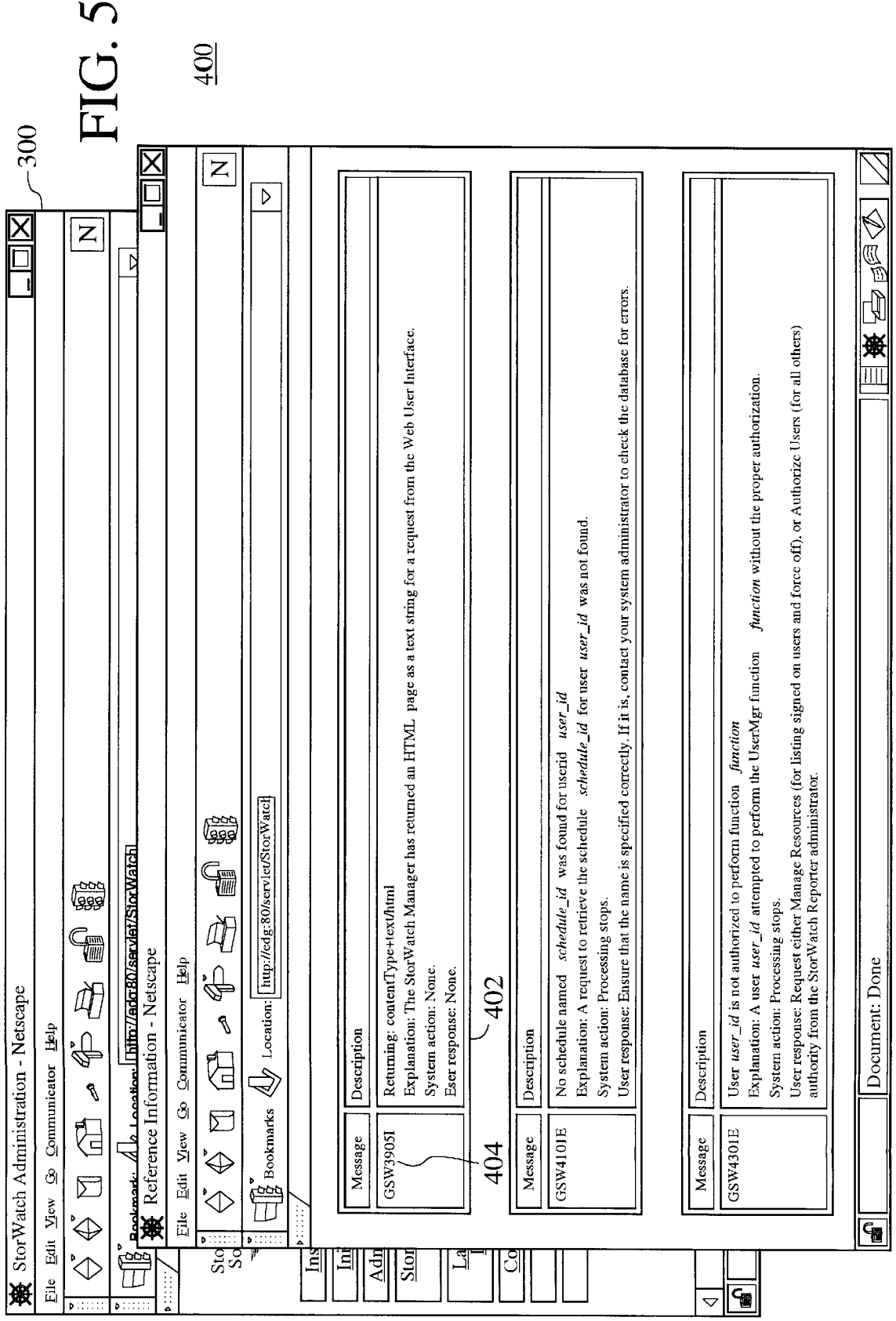
FIG. 5 is a diagram illustrating a detailed explanation of that particular log message of FIG. 4.

The manager uses the identifier number passed from the Java applet to locate the text of the message itself, its detailed explanation and the recommended user response. An HTML message page is returned to the requester and displayed in a new web-browser window. Through the use of a name tag, the manager positions the help text for the selected message 304 (GSW39051) at the top of the web browser window. FIG. 5 illustrates this new web browser window 400 for the message 304 indicated in FIG. 4. The new window 400 appears on top of the current Web-browser window 300, as well as the message log. Once the user views the message help text 402, he/she can close the Web browser window 400, returning to the message log browse task.

The user is directed to specific supporting information for the log message currently selected without leaving the current task through the use of a system and method in accordance with the present invention.

Conclusion

In summary, a method and system for providing easy access to Help text regarding application log messages in a browser user interface displays application log messages on a Java applet panel within the browser. When the user double-clicks on a message, a new Web browser window is displayed which includes an HTML page with the message text, a detailed explanation of the message, and the recommend user response. While browsing the log messages the user might need further information about the message. Finding help for the message is accomplished by clicking on the message within the user interface. This causes another Web browser window to be displayed which contains additional information concerning the message.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for accessing log messages in a distributed network comprising the sequential steps of:

(a) selecting a plurality of application log messages from an agent within the network;

(b) displaying the plurality of log messages via a browser user interface in the first window;

(c) selecting a particular log message from the plurality of log messages, wherein a request is made to a server, the request including an identifying number for the log message, wherein the identifying number can be used to locate the text of the message; and (d) displaying help-text related to the selected particular log message via the browser user interface.

2. The method of claim 1 wherein the browser user interface comprises a Netscape Navigator user interface.

3. The method of claim 1 wherein the browser user interface comprises a Microsoft Internet Explorer user interface.

4. The method of claim 1 wherein the particular log selecting step (c) comprises double clicking on the particular log messages which results in a request being made to a server.

5. The method of claim 4 wherein the request includes a code indicating that a message help page is to be built in a second window.

6. The method of claim 5 wherein the help text displaying step (d) comprises:

(d1) utilizing the identifying numbers by the manager to locate the text of the message;

(d2) obtaining the message help page; and (d3) displaying the message help page in the second browser window.

7. The method of claim 6 wherein in the utilizing step (d1) the identifying number is obtained from a Java applet to locate the text of the message.

8. A computer readable medium containing program instructions for accessing log messages in a distributed network, the sequential program instructions for:

selecting a plurality of application log messages from an agent within the network;

displaying the plurality of log messages via a browser user interface in the first window;

selecting a particular log message from the plurality of log messages, wherein a request is made to a server, the request including an identifying number for the log message, wherein the identifying number can be used to locate the text of the message; and displaying help-text related to the selected particular log message via the browser user interface.

9. The computer readable medium of claim 8 wherein the browser user interface comprises a Netscape Navigator user interface.

10. The computer readable medium of claim 8 wherein the browser user interface comprises a Microsoft Internet Explorer user interface.

11. The computer readable medium of claim 8 wherein the log comprises double clicking on the particular log messages results in a request being made to a server.

12. The computer readable medium of claim 11 wherein the request includes a code indicating that a message help page is to be built in a second window.

13. The computer readable medium of claim 12 which includes program instructions for:

utilizing the identifying numbers by the manager to locate the text of the message;

obtaining the message help page; and displaying the message help page in the second browser window.

14. The computer readable medium of claim 13 wherein the identifying number is obtained from a Java applet to locate the text of the message.

15. A system for accessing log messages in a distributed network comprising:

means for selecting a plurality of application log messages from a manager within the network;

means for displaying the plurality of log messages via a browser user interface in the first window after selecting the plurality of log messages;

means for selecting a particular log message from the plurality of log messages, wherein a request is made to a server, the request including an identifying number for the log message, wherein the identifying number can be used to locate the text of the message; and means for displaying help-text related to the selected particular log message via the browser user interface.

16. The system of claim 15 wherein the browser user interface comprises a Netscape Navigator user interface.

17. The system of claim 15 wherein the browser user interface comprises a Microsoft Internet Explorer user interface.

18. The system of claim 15 wherein the particular log selecting means comprises means for double clicking on the particular log messages which results in a request being made to a server.

19. The system of claim 18 wherein the request includes a code indicating that a message help page is to be built in a second window.

20. The system of claim 19 wherein the help text displaying means comprises:

means for utilizing the identifying numbers by the manager to locate the text of the message;

means for obtaining the message help page; and means for displaying the message help page in the second browser window.

21. The system of claim 20 wherein in the utilizing means the identifying number is obtained from a Java applet to locate the text of the message.

* * * * *